Patented Apr. 19, 1938

2,114,280

UNITED STATES PATENT OFFICE 2,114,280

MAKING GUANIDINE SALTS

Jacob W. H. Aldred, near Sheffield, Ala.

No Drawing. Application August 23, 1935,
Serial No. 37,535

3 Claims. (Cl. 260—125)

(Granted under the act of March 3, 1883, as
amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

This invention relates to the conversion of cyanamide nitrogen in calcium cyanamide to other forms of fixed nitrogen, particularly to fixed nitrogen in the form of guanidine nitrogen.

One of the objects of this invention is to convert the fixed nitrogen in crude calcium cyanamide into a form in which it is available as a plant food which is less toxic than calcium cyanamide. Another object of this invention is to produce the mixture of materials which are rich in guanidine nitrogen. Still another object of this invention is to produce certain guanidine salts which contain more than one fertilizer element. Other objects of this invention include the production of guanidine salts from which guanidine may be readily produced for use in the arts, for instance, in the manufacture of rubber chemicals.

The utilization of crude calcium cyanamide as a fertilizer has been a major problem in the cyanamide industry since commercial production began some decades ago. Free cyanamide, its salts and its soluble polymers, such as dicyanodiamide, are said to be toxic to plants. Consequently, it has been necessary to use calcium cyanamide with certain precautions intended to minimize this difficulty. Furthermore, the use of crude calcium cyanamide in the preparation of mixed fertilizers has been restricted very much since the use of more than a very limited quantity causes a reversion of the mono-calcium phosphate in superphosphate fertilizer mixtures.

Calcium cyanamide may be hydrolyzed to produce ammonia. The ammonia may be used to treat fertilizer mixtures or may be oxidized to nitric acid with the subsequent formation of nitrates which may be incorporated in fertilizer mixtures. Urea may be formed also from calcium cyanamide and this compound may be used as such or in combination in fertilizer mixtures. Free cyanamide from calcium cyanamide has been treated with ammonium salts to produce guanidine compounds.

I have found that calcium cyanamide and solutions of free cyanamide prepared from calcium cyanamide can be subjected to ammonolysis by treatment with ammonium salts and a substantial excess of ammonia under superatmospheric pressures and temperatures to form a product rich in guanidine nitrogen with a high yield only when the cyanamide, ammonium salt and ammonia are present in certain definite proportions. The guanidine may be separated in the form of a guanidine salt from the smaller proportion of other nitrogen compounds produced or further separated as the base, guanidine.

One example is given for the operation of my process. Crude calcium cyanamide is extracted with five times its weight of water for two hours with frequent stirring and the resulting slurry filtered. The calcium in the filtrate is precipitated at once with an amount of 20% sulfuric acid added to give the mixture a pH of 7, using thymol blue indicator and the precipitated calcium sulfate separated by filtration. This latter filtrate, containing about 3% cyanamide nitrogen with small quantities of cyanamide derivatives, is adjusted to a pH of 5 by the further addition of sulfuric acid, using methyl red indicator, and the solution is concentrated by evaporating at a temperature below 70° C. An autoclave is charged with 780 parts by weight of the concentrated cyanamide solution, containing 487 parts by weight of cyanamide, 320 parts by weight of mono-ammonium phosphate and 350 parts by weight of water, and 255 parts by weight of ammonia added to the mixture. The total charge is heated to 150° C. and maintained for one hour at this temperature and under the pressure which is developed in the autoclave. The resulting product of 1473 parts by weight contains 19.8% guanidine nitrogen, which is equivalent to a conversion of 60% of the original cyanamide to guanidine.

Another example is given for the operation of my process. A concentrated cyanamide solution is prepared according to the method given in the example above. An autoclave is charged with 520 parts by weight of the concentrated cyanamide solution, containing 324 parts by weight of cyanamide, 510 parts by weight of ammonium sulfate and 470 parts by weight of an ammonium hydroxide solution, containing 28% ammonia. The charge is heated to 145° C. and maintained for two hours at this temperature and under the pressure which is developed in the autoclave. The resulting product contains 10.05% of guanidine nitrogen which is equivalent to a conversion of 46.5% of the original cyanamide to guanidine.

Still another example is given for the operation of my process. An autoclave is charged with 556 parts by weight of a concentrated cyanamide solution containing 348 parts by weight of cyanamide, 442 parts by weight of ammonium chloride and 542 parts by weight of ammonium hydroxide containing 28% of ammonia. The charge is heated to 145° C. and maintained for two hours at this temperature and under the pressure which is developed in the autoclave. The resulting product contains 13.04% guanidine nitrogen which is equivalent to a conversion of 55% of original cyanamide to guanidine.

In the examples given above the nitrogen in the cyanamide which has not been converted into guanidine nitrogen is substantially completely converted into ammonia, urea, and other nitrogen compounds.

It is evident that there are numerous factors which will influence conditions for the most satisfactory operation of my invention, the actual limits of which cannot be established except by detailed study of each set of raw materials and finished products involved.

The crude calcium cyanamide may be the usual commercial product which contains from 20 to 25% cyanamide nitrogen. This crude calcium cyanamide may be used directly as the source of the cyanamide by charging it with an ammonium salt, water and a substantial excess of ammonia into an autoclave and heating for an optimal period of time, depending upon the nature and proportion of the constituents of the charge. The resulting slurry, which not only contains guanidine nitrogen and ammonia nitrogen, but calcium salts, may be used directly or mixed with other nitrifying materials for nitrifying superphosphate.

The crude calcium cyanamide may be treated with carbon dioxide and water to produce a solution of cyanamide from which the precipitated calcium carbonate produced may be separated. The crude calcium cyanamide may be treated with water to form a solution of acid calcium cyanamide and the calcium precipitated by the addition of dilute sulfuric or dilute phosphoric acid, although dilute sulfuric acid is preferred, until a neutral solution containing cyanamide is obtained. The cyanamide solutions obtained by the methods given above are usually rather dilute and require concentration by evaporation at a temperature below 70° C.

When free cyanamide is used it may be admitted either as a very dilute solution, as a concentrated solution or even as solid cyanamide, although it has in most instances been found preferable to use solutions containing 20 to 50% cyanamide nitrogen. Very concentrated cyanamide solutions lead to more rapid reactions with lower yields of guanidine and increased operating pressure. The more dilute solutions also give lower yields and in addition must be evaporated to recover the product in solid form.

Any ammonium salt of a mineral acid may be used, such as ammonium chloride, ammonium nitrate, ammonium carbonate, ammonium sulfate or an ammonium phosphate. In many instances it is preferable to use an ammonium salt which does not produce materials which are undesirable when the product rich in guanidine is used. For instance, in the production of fertilizer materials, it is preferable to use ammonium nitrate or an ammonium phosphate, since both the nitrate and phosphate are desirable fertilizer constituents.

The amount of ammonia used is such that the charge contains a substantial excess over that equivalent to the amount required to neutralize completely the mineral acid to form an ammonium salt. The use of an excess of ammonia over that necessary to form the ammonium salt has a beneficial effect on the yield of guanidine, particularly with those salts which dissociate at low temperature under normal atmospheric pressure.

The amount of water required will vary within considerable limits, depending upon the source of the cyanamide, the concentration of the cyanamide solution if free cyanamide is used as such, and whether or not gaseous ammonia or ammonium hydroxide is used. The total charge to the autoclave should usually contain an amount of water equivalent to a 20 to 50% solution of the cyanamide contained in the charge.

The ratio of the ammonia used to the cyanamide or the cyanamide equivalent of the charge should be such that there is substantially more than one mol. of ammonia for each mol. of cyanamide. For example, in the treatment of a mixture containing free cyanamide, ammonium nitrate and ammonia, the equivalent molal proportion of $H_2CN_2:HNO_3:NH_3$ should be substantially 1:1:more than 1 and preferably approximately 2; in the treatment of a mixture containing free cyanamide, ammonium sulfate and ammonia, the equivalent molal proportion of $H_2CN_2:H_2SO_4:NH_3$ should be substantially 2:1: not less than 2 and preferably approximately 4; and in the treatment of a mixture containing free cyanamide, an ammonium phosphate and ammonia, the equivalent molal proportion of $H_2CN_2:H_3PO_4:NH_3$ should be substantially 3:1: more than 3 and preferably approximately 6.

The temperature of the reaction may range from 50 to 180° C., although a temperature between 130 to 180° C. is preferred.

The pressure in the autoclave depends primarily upon the reaction temperature and the partial pressures of the ammonia and the water above the mixture, for example with a proportion of $H_2CN_2:H_3PO_4:NH_3$ of 3:1:6 and the average reaction temperature of 150° C., the pressure range is 250 to 360 pounds per square inch during the period of treatment for one hour.

It will be seen, therefore, that this invention actually may be carried out by the modification of certain details without departing from its spirit or scope.

I claim:
1. Process of making guanidine sulfate from calcium cyanamide, which comprises forming a mixture of the calcium cyanamide with ammonium sulfate, ammonia and water to produce a mol. ratio of $H_2CN_2:H_2SO_4:NH_3$ of 2:1:more than 2; and heating the mixture in an autoclave at 130° to 180° C. to form a product rich in guanidine sulfate.

2. Process of making a mixture rich in a guanidine salt from calcium cyanamide, which comprises forming a mixture of the calcium cyanamide with an ammonium salt, ammonia in an amount not less than one mol. for each mol. of cyanamide, and water; and heating the mixture in an autoclave to form a product rich in the guanidine salt.

3. Process of making a mixture rich in a guanidine salt from an alkaline earth metal cyanamide which comprises forming a mixture of the cyanamide, an ammonium salt, ammonia in an amount not less than one mol. for each mol. of cyanamide, and water; and heating the mixture in an autoclave to form a product rich in the guanidine salt.

JACOB W. H. ALDRED.